Aug. 31, 1965  P. A. LEPELLETIER  3,203,512
HYDRAULIC DRUM BRAKE
Filed Feb. 8, 1963  6 Sheets-Sheet 4

INVENTOR.
Pierre Andre Lepelletier
BY
Irvin S. Thompson
Attorney

Aug. 31, 1965  P. A. LEPELLETIER  3,203,512
HYDRAULIC DRUM BRAKE

Filed Feb. 8, 1963  6 Sheets-Sheet 6

INVENTOR.
Pierre André Lepelletier
BY
Attorney

# United States Patent Office 3,203,512
Patented Aug. 31, 1965

3,203,512
HYDRAULIC DRUM BRAKE
Pierre André Lepelletier, Chatou, France, assignor to Societe Anonyme Francaise du Ferodo, Paris, France, a corporation of France
Filed Feb. 8, 1963, Ser. No. 257,221
Claims priority, application France, Feb. 13, 1962, 887,845
19 Claims. (Cl. 188—152)

The present invention has for its object a hydraulic drum brake comprising gripping shoes which are intended to rub against a rotating drum when they are subjected to an expansion, and which are guided with respect to a fixed support incorporating the brake plate when they are subjected to elastic restoring forces tending to return them to a definite position of rest, the hydraulic drum brake being especially characterized in that the shoes co-operate with two pistons sliding respectively in two coaxial bores which are formed in a cylinder, and one of which has a larger diameter than the other, the large piston having a tail-rod surrounded by a movable ring engaged in the small bore, a so-called primary chamber connected to a pressure circuit being defined in the said bore by the small piston, the tail-rod of the large piston, and the ring, while a so-called secondary chamber connected to another pressure circuit is defined in the large bore by the large piston and the ring.

During reverse running, if the pressure in the secondary chamber is established with a slight delay with respect to the pressure in the primary chamber and if, in consequence, the small piston is caused to make a to-and-fro movement, this reversal of movement if effected by a conjoint travel of the two pistons and the ring, without variation of the volume of oil contained in the primary chamber, by reason of the equality of section, along the small bore, of the small piston and the ring. This results in an operation free from any untimely chatter.

According to a further characteristic feature, the shoes are guided by their webs in application against projections on the fixed plate. This arrangement has the effect of facilitating their sliding action on these projections by bringing the passive resistances substantially into the central plane of the shoes in which the return forces are applied.

The objects, characteristic features and advantages of the invention will furthermore be brought out in the description which follows below of forms of embodiment chosen by way of example, reference being made to the accompanying drawings, in which.

Figure 1:
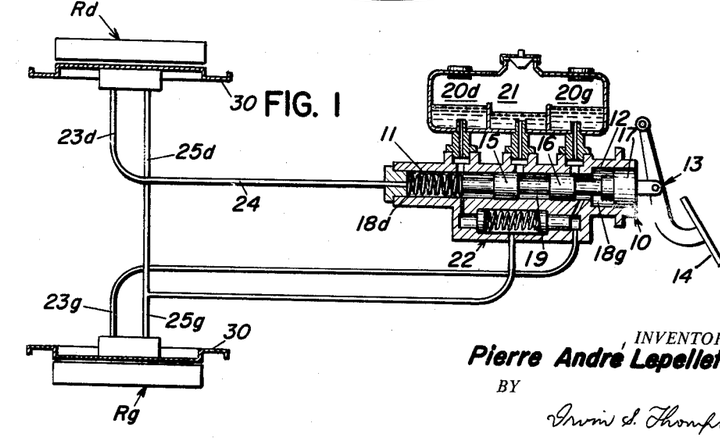
FIG. 1 is a diagram of a brake control capable of actuating brakes according to the invention.

Reference will first be made to the diagram of FIG. 1 which shows an example of a brake control for an automobile vehicle. In FIG. 1, there can be seen at 10 a master cylinder which comprises two cylindrical bores in line: a front bore 11 and a rear bore 12 which has a larger diameter than the bore 11. In the bores 11 and 12 is mounted a sliding unit 13 actuated by the brake pedal 14. The unit 13 comprises two pistons 15 and 16 working in the bore 11 and a piston 17 working in the bore 12. In front of the front piston 15 is formed a primary chamber 18d; between the pistons 15 and 16 is formed a secondary chamber 19; between the pistons 16 and 17 is formed a further primary chamber 18g. The various chambers 18d, 19 and 18g are connected to tanks 20d, 21 and 20g through the intermediary of clappers which can be rocked by the unit 13. The chambers 18d, 19 and 18g are also connected to a pressure-comparing station 22. The chambers 18d and 18g are respectively connected to two primary conduits 23d and 23g leading respectively to the right-hand wheel Rd and the left-hand wheel Rg of the vehicle. Equal volumes of oil are driven into the conduits 23d and 23g by the depression of the pedal 14. The chamber 19 is connected to a secondary conduit 24, of which one branch 25d leads to the wheel Rd and one branch 25g to the wheel Rg.

In an alternative form of embodiment, the piston 16 may be of a diameter different from that of the piston 15, and when the piston 15 has a diameter smaller than that of piston 16, the volume of the chamber 19 decreases when the unit 13 is actuated, and the chamber 19 can also displace a certain, preferably small volume of oil into the conduit 24.

Reference will now be made to FIGS. 2 to 7, in which is shown an example of a brake according to the present invention, which corresponds to the brake of the left-hand wheel Rg of the vehicle, and at which terminate the primary conduit 23g and the secondary conduit 25g.

Figure 2:
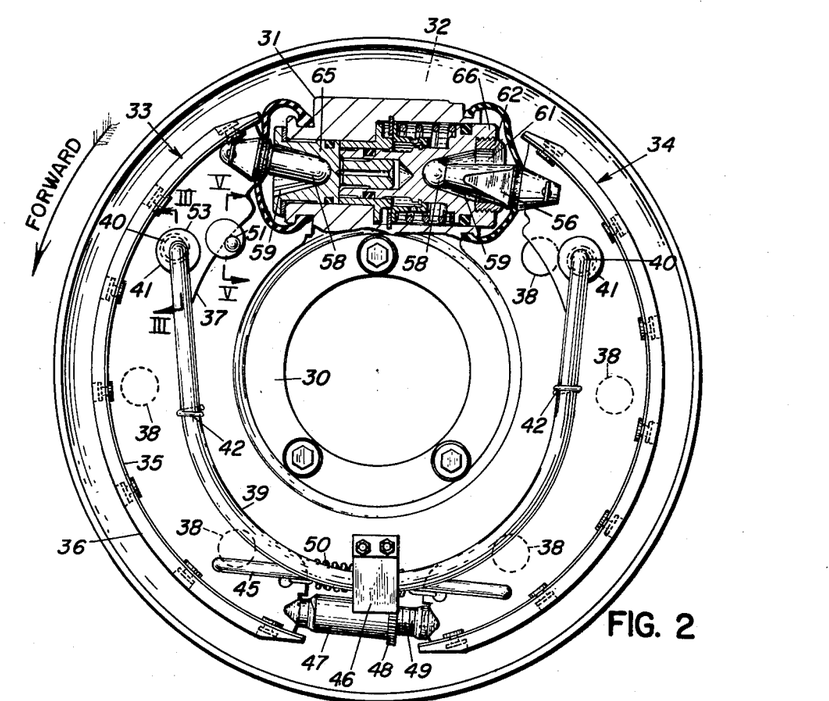
FIG. 2 is a view in elevation of a brake according to the invention.
Figure 3:
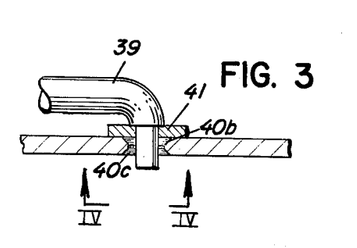
FIG. 3 is a view of the coupling of the return spring on a shoe, in cross-section taken along the line III—III of FIG. 2.
Figure 4:
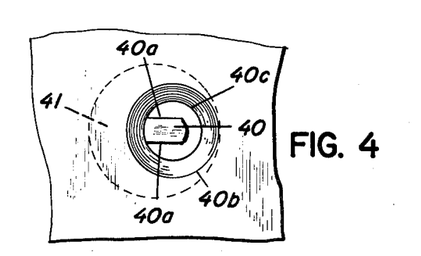
FIG. 4 is a view of this coupling looking in the direction of the arrows IV—IV of FIG. 3.
Figure 6:
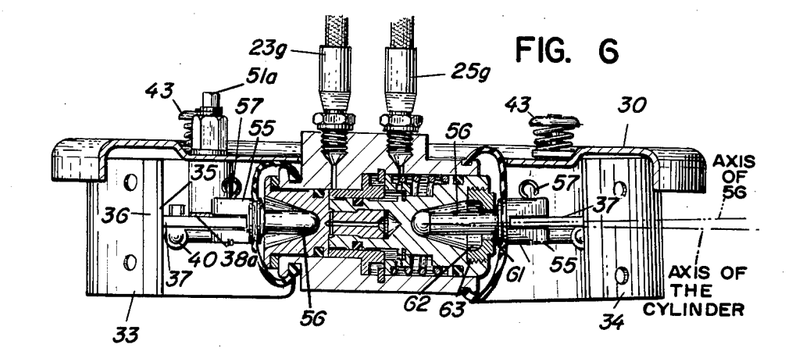
FIG. 6 is a plan view of the brake of FIG. 2 with parts broken away.

The brake comprises a rear fixed plate 30 to which is fixed a double wheel cylinder 31, together with a drum 32 which is rotatably mounted in front of and close to the plate 30, and which is rigidly fixed to the wheel. In the interior of the drum 32 are mounted two brake shoes 33 and 34, positioned with respect to the plate 30, the shoes being operated by the cylinder 31 and being intended to co-operate frictionally with the drum 32. The two shoes 33 and 34 are symmetrical and interchangeable.

Each shoe 33, 34, is composed of a cylindrical segment 35 covered externally by a friction lining 36, and of a flat web 37 fixed to the interior of the segment 35 along the central line of the segment. Each shoe 33, 34 rests by its web 37 on projecting slide-supports which are fixed to the plate 30 and which, in the example shown, consist of pads 38 lined with a friction material 38a.

A return spring 39 in the form of a U is coupled at its extremities 40 to the shoes 33 and 34. Each extremity 40 has flattened portions 40a (FIG. 2 to 4) and receives a washer 41 which bears against the web 37. The extremity 40 passes through a hole 40b in the web 37. This hole 40b is provided with a double chamfer so that it forms a ridge 40c, against which abuts the extremity 40 in a position which always remains correct, even if the extremity 40 becomes slightly skewed.

The spring 39 tends to be brought closer to the plate 30 by two clips 42 which are coupled to the plate 30 by means of an elastic device which permits a universal pivotal movement and comprises a spring 43. In its central portion, the spring 39 rests on a helicoidal spring 50 threaded over a strap 45. The latter rests on the webs 37 of the shoes 33 and 34. Thus, the spring 39, the main function of which is to return the shoes circumferentially, forms an intermediate means for applying the webs 37 of the shoes axially against the guides 38, at the same time ensuring perfect positioning of the said shoes.

A movement-limiting member 46, which acts axially, is fixed to the plate 30 and covers the spring 39 above the assembly 45–50 in order to prevent, in any eventuality, the shoes 33 and 34 from moving too far away from their axial support on the guides 38.

Opposite the cylinder 31, the shoes 33 and 34 are coupled circumferentially by their extremities by means of an adjuster 47, the length of which is adjustable by a nut 48 engaged on a screw 49. The spring 30 ensures the maintenance of the shoes in abutment against the adjuster and prevents any rotation of the nut 48.

Figure 5:
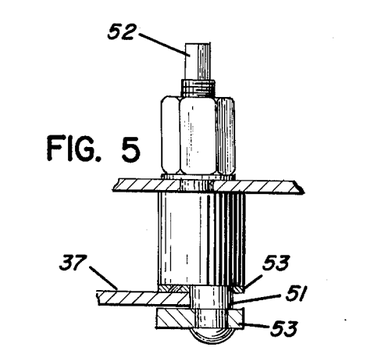
FIG. 5 is a view of the eccentric guide of a shoe, in cross-section taken along the line V—V of FIG. 2.

In the vicinity of the cylinder 31, the shoe 33 is radially positioned by means of an eccentric 51 which is fixed to the plate 30, in an angularly-adjustable manner by a screw 52, and which is applied against the edge of the web 37 by means of cheeks 53 arranged on each side of the said web 37, in order to limit the axial play of the shoe 33.

Each of the shoes 33 and 34 has its web 37 held axially between the two arms of a fork 55, fixed to a push-rod 56 secured to the web 37 by a simple split pin 57 having a certain amount of play and preventing it from escaping.

Figure 7:
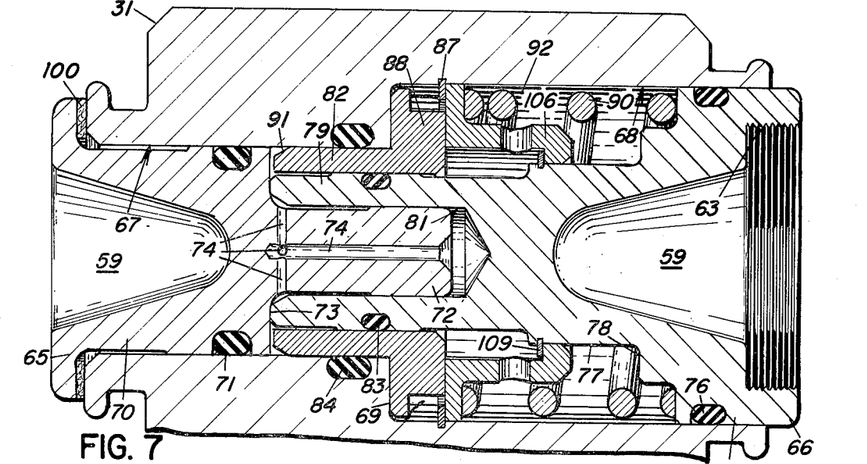
FIG. 7 is a view on a large scale and in section of the actuating cylinder of this brake.

Each push-rod 56 has one extremity in the form of a ball 58 which is engaged in a housing 59 of the primary piston 65 or the secondary piston 66 of the cylinder 31. The push-rod 56 associated with the shoe 34 which has no eccentric 51, is positioned axially by being engaged in a slot 61 formed in a screw 62 screwed at 63 into the secondary piston 66.

The axis of each push-rod 56 is made slightly inclined on a plane perpendicular to the axis of the brake (plan view of FIG. 2), as can be seen from FIG. 6. An inclination of this kind will correspond, for example, to a displacement of about one millimetre between the central plane of rest of the shoes and the axis of the cylinder 31. Thus, the braking effort generates an axial component tending to force the shoes 33 and 34 against the guides 38, and which is additive to the force already applied by the clips 42 and the springs 43.

The cylinder 31 (see more particularly FIG. 7) has two bores in line, a primary bore 67 of smaller diameter than the secondary bore 68, the bores being separated from each other by a shoulder 69.

The primary piston 65 is composed of a body 70 which is slidably engaged in the bore 67, and which comprises a fluid-tight joint 71 and a tail-rod 72, which is separated from the body 70 by a shoulder 73. Communication passages 74 are formed in the tail-rod 72.

The secondary piston 66 is composed of a body 75 which is slidably engaged in the bore 68 and which comprises a fluid-tight joint 76 for an intermediate cylindrical boss 77 which is separated from the body 75 by a shoulder 78 and a tail-rod 79. The tail-rod 79 comprises a cylindrical hole 81 in which is engaged the tail-rod 72 of the primary piston 65. The tail-rod 79 has a smaller external diameter than the diameter of the primary bore 67.

In the annular space comprised between the tail-rod 79 and the bore 67 is engaged a ring 82. A fluid-tight joint 83 is provided between the tail-rod 79 and the ring 82, while a fluid-tight joint 84 acts between the ring 82 and the bore 67.

The ring 82 has a collar 88 which co-operates in abutment with the shoulder 69 preventing the ring 82 from going beyond a pre-determined position in the cylinder 31, towards the primary side. The collar 88 also co-operates in abutment with a keeper-ring 87 embedded in the bore 68, preventing the ring 82 from going beyond a predetermined position in the cylinder towards the secondary side.

A ring 106 forms a seating for a helicoidal centering spring 90 applied to the piston 66, and cooperates in abutment with the keeper-ring 87 and the collar 88. The seating 106 also co-operates in abutment with a keeper-ring 109 of the boss 77 and with the shoulder 78.

The centering spring 90 tends to bring the ring 106 back over the keeper-ring 87. The primary piston 65 is provided with a collar fitted with a lining 100, by which it comes into abutment against the cylinder 31 in order to define the position of rest of the said primary piston.

A primary chamber 91 is formed in the bore 67 and is closed in a fluid-tight manner by joints 71, 83 and 84. It is coupled to the primary conduit 23g. The primary pressure which exists in this chamber acts on the primary piston 65 over the whole section of the bore 67, acts on the secondary piston 66 over the cross-section of the secondary piston 66 over the cross-section of the tail-rod 79, and acts on the ring 82 over the section of the bore 67 less the section of the tail-rod 79.

A secondary chamber 92 is formed in the bore 68 and is closed in a fluid-tight manner by the joints 83, 84 and 76. It is coupled to the secondary conduit 25g. The secondary pressure which exists in this chamber acts on the secondary piston 66 over the section of the bore 68 reduced by the section of the tail-rod 79, upon the cylinder 31, over the section of the bore 68, reduced by the section of the bore 67, and on the ring 82 over the section of the bore 67 reduced by the section of the tail-rod 79.

The right-hand brake has a construction similar to that which has been described above for the left-hand brake, the chambers 91 and 92 of the right-hand brake being connected respectively to the conduits 23d and 25d.

When the brake pedal 14 is not operated, the pressure is released in the chambers 91 and 92. The spring 39 holds the pistons 65 and 66 in the position where they are closest together, at which the tail-rod 79 is in abutment against the shoulder 73, while the spring 90 keeps the assembly 65–66 in a position exactly defined in the cylinder 31 (FIG. 7), at which appropriate reserves of fluid are arranged in the chambers 91 and 92.

The pistons 65 and 66 being thus maintained in defined positions, the position of the shoes 33 and 34 is in turn exactly defined with respect to the plate 30, and is such that the shoes are slightly spaced apart radially from the drum 32 by a space, the uniformity of which can be adjusted by the eccentric 51, while the correct operation of the shoes is in turn ensured by the guides 38 and the members 42, 39, 45, 46, 51 and 62.

When the brake pedal 14 is actuated, equal volumes of fluid are driven from the chambers 18d and 18g through the conduits 23d and 23g into the primary chambers 91 of the two brakes, while the primary chambers 18d–23d and 18g–23g are isolated from each other and from the secondary chamber 19–24–25d–25g. Each primary chamber 91 increases in volume, which has the effect of separating the pistons 65 and 66 from each other, and of causing an expansion of the shoes 33 and 34, which in the first place results in an approach towards the drum 32.

When the vehicle is moving forward (direction of the arrow F in FIG. 2), the arrival of the shoe 33 into contact with the drum 32 results in a circumferential drive of this shoe in the direction F by the drum, the shoe 33 pushing the adjuster 47 and the shoe 34 in the same direction, so that the pistons 65 and 66 tend in turn to be displaced as a whole in the direction F, to the extent permitted by the accentuation of the braking which tends to move them away from each other.

The result is that it is the primary pressure in the chamber 91 which actuates the brake, while the secondary pressure in the chamber 92—which is much higher than the primary pressure—absorbs the braking reaction by means of an inward movement of the secondary piston 66 towards the left-hand side of FIG. 2 or FIG. 7.

The secondary pressure is necessarily the same in the two brakes, since the conduits 25d and 25g are in communication at 24. Taking account of the differences in pressure which can possibly be produced in the two primary chambers 91, and which are due to dissimilar conditions of friction in the two wheels, an excellent balance is observed, the secondary pressure playing a much more important part than either of the primary pressures, while the position of equilibrium of each of the parts is precisely defined.

If the secondary circuit 24–25d–25g were to break during forward running, the device 22 (FIG. 1) would immediately restore equality of pressure in the primary circuits, while each of the secondary pistons 66 would come into contact by the shoulder 78 with the ring 106 which is in turn in abutment against the keeper-ring 87 and on the collar 88, abutting against the shoulder 69. The braking thus remains effective under good conditions, similar to those of a conventional balancing system.

If one of the primary circuits were to break during forward running, the secondary pressure maintained in the chamber by means of the brake which is still in operation would then actuate the defective brake by the secondary piston 66.

This latter ensures the expansion alone, whereas the primary piston is not operated and rests at 100 on the cylinder 31. The operation of the brake thus remains effective, although there may result a slight reduction in the braking torque due to the disappearance of the primary pressure, and a slight rocking movement of the shoes 34 and 33 in the direction opposite to F.

During reverse running, the brake is actuated at the same time by the primary pressure in the chamber 91 and by the secondary pressure in the chamber 92, while the primary piston 63 absorbs the braking reaction and abuts against the cylinder 31 by its collar 100. The secondary pressure is in this case much lower than the primary pressure. Beyond a certain threshold of pressure, the ring 82 can be pushed back towards the right and the spring 90 may be compressed by the preponderance of the primary pressure up to the moment when the ring 82 can come into abutment against the keeper-ring 87.

It will be observed that, taking account of the control system of FIG. 1, the secondary pressure is in reality only established with a slight delay following the primary pressure, the primary piston first beginning to move forward before being returned towards the rear up to abutment at 100, by the braking reaction. The construction described has the important advantage of permitting this abrupt reversal of movement to take place without variation of the volume of fluid contained in the primary chamber 91, due on the one hand to the equality of travel at that moment of the secondary piston 66 with the ring 82 with the travel of the primary piston 65 and, on the other hand, to the equality of section of the primary piston and the ring 82, which section is that of the cylindrical bore 67. This prevents any chattering which could result from this reversal of movement at that moment of the operation.

Figure 8:
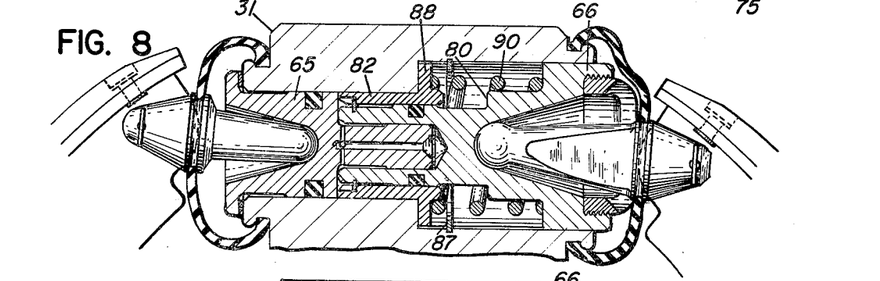
FIG. 8, 9 and 10 are views similar to FIG. 7, but relating respectively to three alternative forms of construction.

Reference will now be made to FIG. 8, in which the arrangement is similar to that which has just been described with reference to FIGS. 1 to 7, but in which the ring 106 is dispensed with. The spring 90 is supported directly against the collar 88 of the ring 82, while the ring 82 is intended to abut against a shoulder 80 of the secondary piston 66. The operation is similar to that which has been described previously, but, in the event of a failure on a primary circuit, while at the same time maintaining the same safety, the user is more effectively warned of the unusual phenomenon which is taking place, by the occurrence of a much more marked difference in torque between the two brakes.

Figure 9:
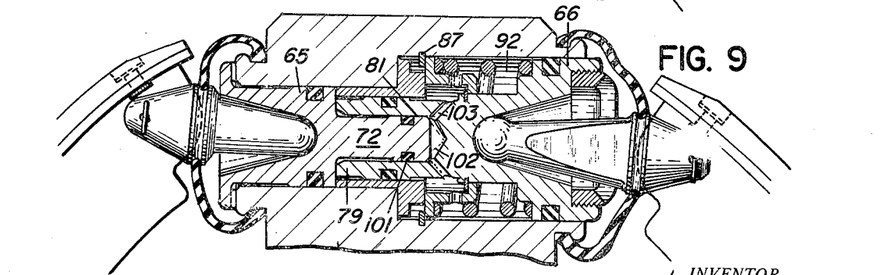

In the alternative construction shown in FIG. 9, no communication passage such as 74 is provided in the tail-rod 72 of the primary piston 65, but on the contrary, a fluid-tight joint 101 is arranged between the tail-rod 72 of the primary piston and the hole 81 in the tail-rod 79 of the secondary piston 66. Thus, the bottom 102 of the hole 81 is separated from the primary chamber 91, while passages 103 formed in the tail-rod 79 provide a communication with the secondary chamber 92. By this means, a still more powerful braking effect is obtained.

In this alternative, the construction with the ring 106 of FIG. 7 has been adopted, but the construction of FIG. 8 without the ring 106 could also be applied.

Reference will now be made to FIG. 10, 11, 12 and 13, in which is shown a further alternative construction of brake having not one, but two hydraulic cylinders. The return spring, instead of being a rod 39 bent to a U-shape, consists in this case of two helicoidal springs 39a and 39b.

Figure 12:
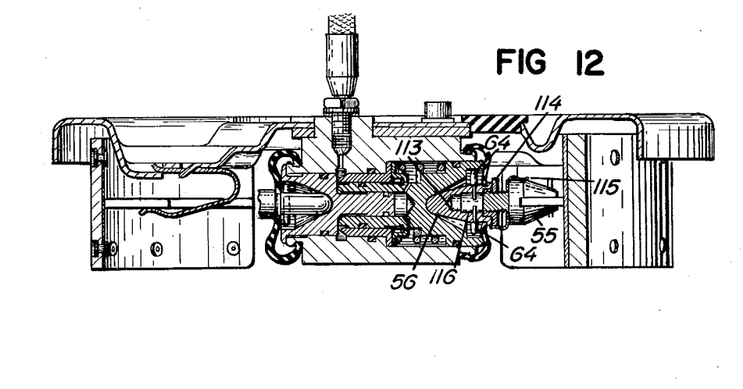
FIG. 12 is a plan view of the brkae of FIG. 11, with parts broken away.
Figure 13:
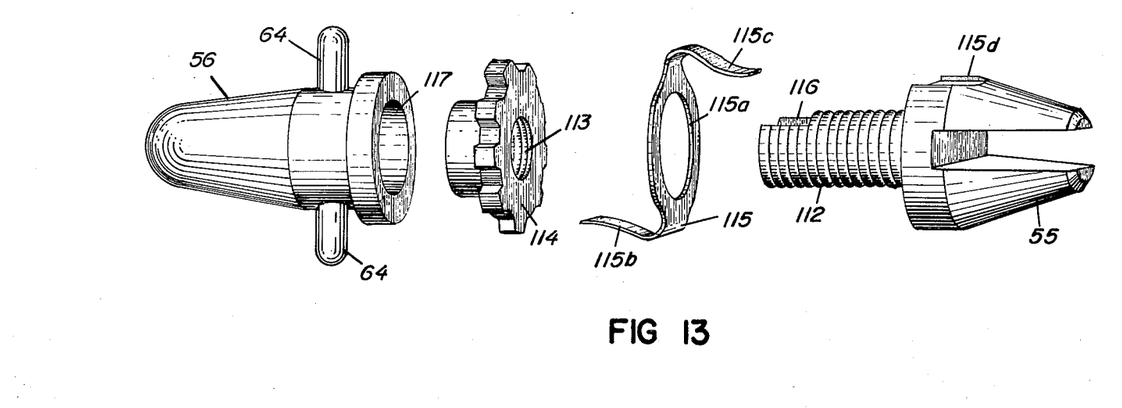
FIG. 13 is a view in exploded perspective of a detail of the brake of FIGS. 11 and 12.

As can be seen from FIG. 12, the push-rod 56 comprises two fingers 64, and the fork 55 is mounted adjustably with respect to the push-rod 56. The fork 55 (FIGS. 12 and 13) comprises a threaded tail-rod 112 which screws into a threaded hole 113 of a notched regulating wheel 114 engaged in a smooth hole 117 in the push-rod 56, and prevented from rotating by a brake 115. The brake 115 is of spring steel traversed by an elongated port 115a so as to balance the tensions on its two curved extremities: one extremity 115b engages in a notch of the regulating wheel 114, and the other extremity 115c on a flat portion 115d of the fork 55, which ensures immobilization of the assembly. The tail-rod 112 is provided with a diametral slot 116, in which are engaged the fingers 64 so as to keep them directed perpendicularly to the fork, whatever the adjustment may be.

The cylinder 31 (FIG. 10) is arranged in a manner similar to that of the cylinder 31 of FIG. 9. The tail-rod 72 is again engaged in the hole 81 with the fluid-tight joint 101, while the bottom 102 communicates with the secondary chamber 92. As an alternative, it could also be arranged in the manner shown in FIGS. 7, 8 and 9.

Figure 10:
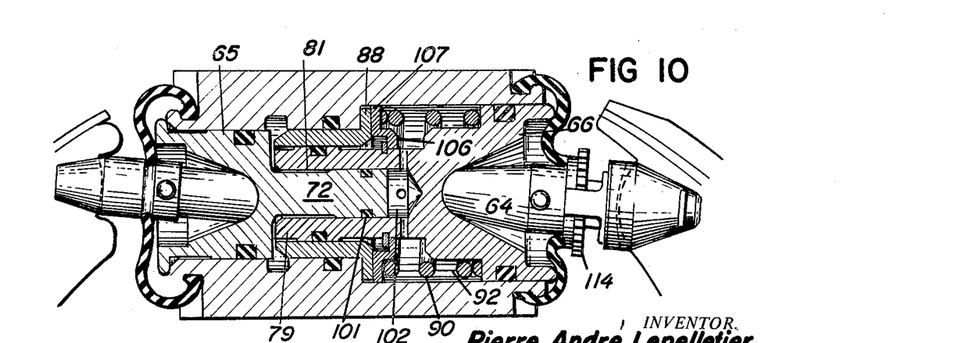

The ring 106, serving as a seating for the spring 90, co-operates in this case however in abutment by its outer edge 107 only with the collar 88, while the keeper-ring 87 is dispensed with.

In the brake of FIGS. 10 to 13, the adjuster 47 and the spring 50, which are arranged in FIG. 2 between the shoes 33 and 34 opposite the cylinder 31, are eliminated and replaced by another cylinder 118 (FIG. 11), in which is mounted a piston unit 119 connected by push-rods 120 and 121 respectively to the shoes 33 and 34.

Figure 11:
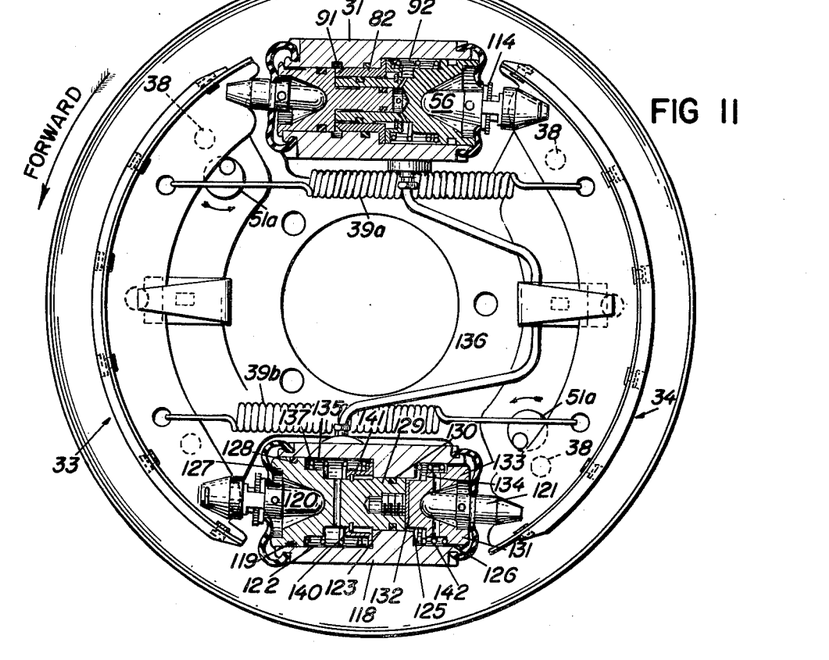
FIG. 11 is a view in elevation of an alternative form of brake, comprising the cylinder of FIG. 10 and another cylinder.

The cylinder 118 comprises a bore 122 separated from a bore 123 of smaller diameter by a shoulder 124, while a shoulder 125 separates the bore 123 from a rebate 126 of larger diameter than the bore 123. The piston unit 119 comprises: a piston 127 which is provided with a fluid-tight joint 128 and which slides in the bore 122, a tail-rod 129 which is provided with a fluid-tight joint 130 and which slides in the bore 123, and a part 131 which is screwed into the tail-rod 129 and which has two portions 132 and 133 freely engaged in the bore 123 and the rebate 126. These two portions 132 and 133 are separated by a shoulder 134 which co-operates in abutment with the shoulder 125.

In the bore 122, between the joints 128 and 130, is formed a chamber 135 which is connected by a conduit 136 to the secondary chamber 92. In the chamber 125 is housed a spring 137 which is supported against the piston 127 and against a ring 140. The latter co-operates in abutment with the shoulder 124 and with a keeper-ring 141 housed in the piston 119. A further spring 142 is arranged between the part 131 and the shoulder 125.

The push-rod 120 which is interposed between the shoe 33 and the piston 127 has a construction similar to that of the push-rod 56 and also comprises an adjusting nut 114. Two eccentrics 51a are provided and are arranged at the extremity of each shoe 33 or 34 opposite to the push-rod 120 or to the push-rod 56, along a cylindrical bearing surface on the shoe.

During forward running, the first wheel cylinder 31 acts exactly like that of the brake of FIG. 9 while the secondary oil compressed at 135 in the second cylinder 118 substantially balances the braking reaction between the two shoes 33 and 34, by virtue of an appropriate choice of the sections.

During forward running, and in the event of failure of secondary pressure, everything takes place as if the second wheel cylinder 118 did not exist, and as if the coupling between the two shoes were direct, with the exception of the slight moderating action of the return spring 137 of the second cylinder 118.

During forward running, and in the event of failure of the primary pressure, the first wheel cylinder 31 again acts exactly like that of FIG. 9. The piston 119 of the second wheel cylinder 118 is effectively actuated both by the secondary jaw and by the secondary pressure, and the operation finally remains the same as before apart from a slight reduction in the braking torque due to the disappearance of the primary pressure.

During reverse running, the brake again acts exactly like that of FIG. 2, except for a slightly increased power due to the secondary pressure which, although small, nevertheless appears in the cylinder 118 and increases the force acting on the shoe 33.

In the cylinder 31 of FIG. 10, the arrangement of the tail-rods 72 and 79 could alternatively be similar to that shown in FIG. 7, that is to say with a communication with the primary space 91 instead of the secondary space 92.

Figure 14:
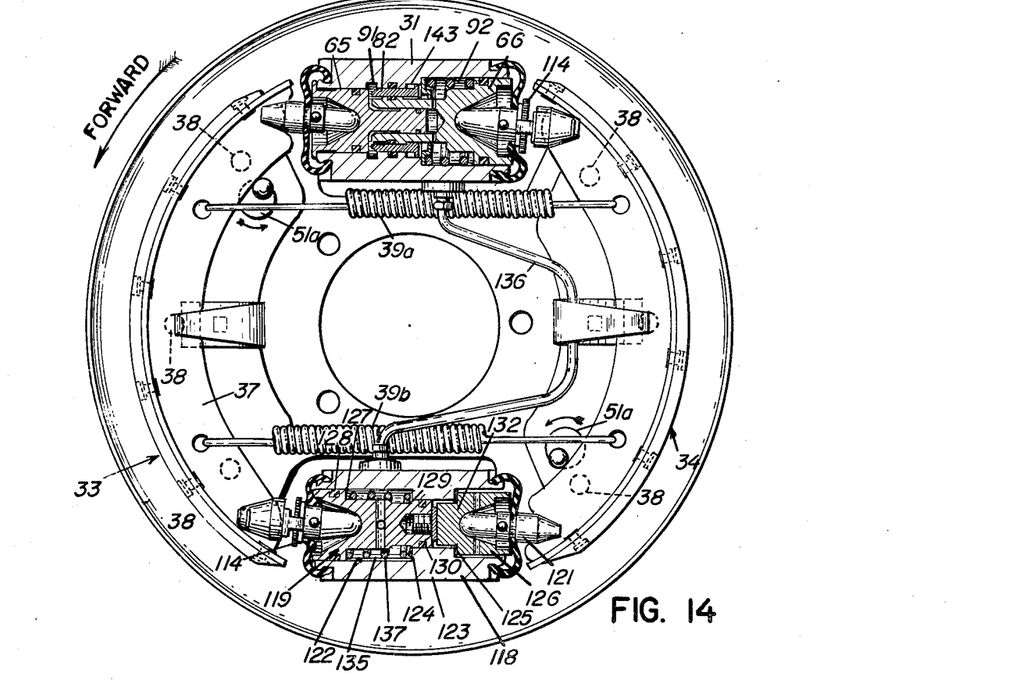
FIG. 14 is a view similar to FIG. 11, but relating to a further alternative construction of the brake.
Figure 15:
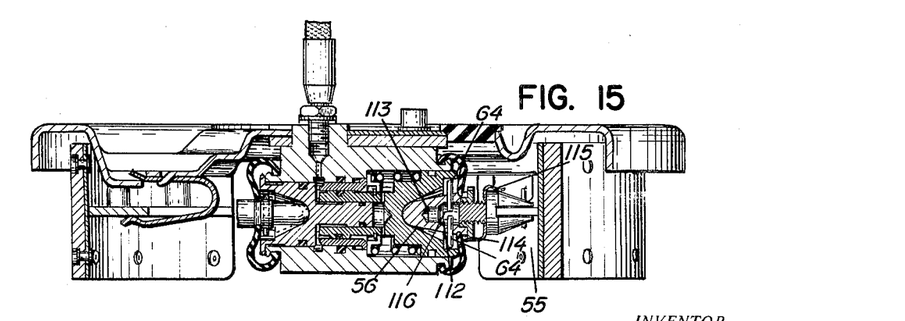
FIG. 15 is a plan view of the brake of FIG. 14 with parts broken away.

Reference will now be made to FIGS. 14 and 15, in which the arrangement is similar to that which has just been described with reference to FIGS. 10 to 13, but in which the second cylinder 118 is not provided with a ring 140, nor with a keeper-ring 141, nor with the spring 142. In addition, in the first cylinder 31, a play 143 is provided between the ring 82 and its supporting shoulder on the cylinder, so that this ring 82 can be pushed in towards the primary side under the thrust of the secondary pressure.

During forward running, the primary pressure in the chamber 91 actuates the brake, while the secondary pressure in the chamber 92, much higher than the primary pressure, absorbs the braking reaction by means of a slight inward movement of the piston 66. The ring 82 is subjected, with equal sections, to the primary pressure and to the preponderant secondary pressure, and carries out the whole of its travel towards the primary side until the play 143 is taken-up. This travel is chosen to be less than or at most equal to the normal travel of the primary piston 65, so that the abutment really takes place against the fixed shoulder of the cylinder 31 and not on the primary piston 65.

Everything then takes place as if an additional volume of oil equal to that displaced by the ring 82 were driven into the primary chamber 91 and into the primary circuit. This results in a favourable manner simultaneously in a reduction of the travel of the pedal 14 and a reduction of the time of increase of the braking effort.

During forward running, and in the event of failure of secondary pressure, the operation is the same, except for the fact that instead of the ring 82 being actuated hydraulically by the secondary pressure, it is mechanically operated by the secondary piston 66 itself, when this latter takes a fixed support at the end of its travel. The various shoulders are located in such manner that the final position of the ring 82 is the same as when it is actuated hydraulically, and that the resulting advantages are retained, namely: reduction in the travel of the pedal and of the time of increase of the braking effort.

During forward running, and in the event of failure of the primary pressure, the secondary pressure actuates the brake at the same time by the secondary piston on the secondary side and by the ring 82 on the primary side. The section of the ring 82 is provided sufficient for it to be able to actuate without difficulty the primary piston 65, up to the moment when it comes into abutment against the wheel cylinder. This is made possible by the fact that the force to be developed on the primary side is much less than on the secondary side, and permits the brake to be applied by supplying only a small quantity of secondary oil.

It should be observed that the travel of the ring 82 on the primary side of the cylinder 31 is made greater than or at least equal to the gripping travel of the primary shoe, so that the latter always operates the piston 127 until the linings 36 become sufficiently worn to necessitate an adjustment. The operation then remains the same as before, except for a still smaller and practically unnoticeable reduction of the braking torque, due to an increased working section on the secondary side.

During reverse running, the first wheel cylinder acts exactly like those of the brakes previously described, except in the case of the primary piston which, having no braking reaction to absorb, is effectively permitted to move outwards. The braking reaction is taken-up by the second wheel cylinder 118 which, receiving this time a greater reaction from the secondary shoe than from the primary shoe, comes hard into abutment at 134–125 and becomes a fixed point. The brake operates as a brake with one compressed shoe (the secondary) and one stretched shoe (the primary), actuated only by the first wheel cylinder 31. This particular feature results in a reduction in the power of the brake and in the quantity of secondary oil necessary to apply the brake, which are all favourable elements in the case of reverse running.

The provision of a play 143 for the ring 82 for the purpose of economy of oil could also be adopted in a brake such as that of FIGS. 2 to 7, or that of FIG. 9.

What I claim is:

1. A hydraulic drum brake comprising gripping shoes which are adapted to come into frictional contact with a rotating drum when they are subjected to expansion, and which are guided with respect to a fixed support incorporating the brake-plate when they are subjected to elastic forces tending to return them towards a defined position of rest, in which said shoes co-operate with two pistons sliding respectively in two coaxial bores which are formed in a cylinder and of which one has a larger diameter than the other, the large piston having a tail-rod enclosed by a movable ring which is axially slidable relative to said tail-rod and which is engaged in and axially slidable relative to the small bore, a primary chamber coupled to a fluid-pressure circuit being defined in said small bore by the small piston, the tail-rod of said large piston, and said ring, while a secondary chamber coupled to another fluid-pressure circuit is defined in said large bore by the large piston and said ring.

2. A brake as claimed in claim 1, in which said two pistons are in abutment one with the other and ensure a minimum condition of separation of said shoes.

3. A brake as claimed in claim 1, in which said small piston is provided with a tail-rod engaged in a hole in the tail-rod of said large piston, said hole communicating with one of said chambers.

4. A brake as claimed in claim 1, in which said ring co-operates in abutment with said cylinder.

5. A brake as claimed in claim 1, and further comprising a spring interposed between said large piston and a member co-operating in abutment, both with said cylinder and with the tail-rod of said large piston.

6. A brake as claimed in claim 5, in which said member is the ring itself.

7. A brake as claimed in claim 5, in which said member is constituted by a second ring co-operating in abutment with said first ring.

8. A brake as claimed in claim 7, and further comprising a collar on said first ring, said collar being clamped in the position of rest between said second ring and a fixed shoulder on said cylinder.

9. A brake as claimed in claim 7, in which said first ring is provided with a clearance on each side of its position of rest, said clearance being limited by a positive abutment on the wheel cylinder of the primary side and by a relative abutment on the secondary piston of the secdonary side.

10. A brake as claimed in claim 1, in which opposite the cylinder, said shoes are coupled together by an adjuster maintained in position by means of a helicoidal spring.

11. A brake as claimed in claim 10 and further comprising a guide strip supported against the flat web of the two shoes so as to ensure their correct parallelism with respect to the brake-plate, said guide strip being threaded into and positioned inside said helicoidal spring.

12. A brake as claimed in claim 1, in which opposite to the cylinder, said shoes are coupled to each other by a spacing piston which is subjected to the pressure existing in the secondary chamber of said cylinder, and which tends to come into abutment with at least one fixed support under the action of at least one spring.

13. A brake as claimed in claim 12, in which said spacing piston is adapted to move in both directions from a position of rest between two abutments.

14. A brake as claimed in claim 12, in which said spacing piston is adapted to move in a single direction only, starting from a position of rest against one abutment.

15. A brake as claimed in claim 1, in which said shoes are guided by their webs which are applied against projections provided on said fixed plate.

16. A brake as claimed in claim 15, in which said projections are provided each with a supporting surface of friction material.

17. A brake as claimed in claim 15, in which said projections are constituted by isolated studs.

18. A brake as claimed in claim 1, in which a slight displacement between the central plane of rest of said shoes and the axis of said cylinder gives rise to an axial component of the forces produced during the application of fluid pressure, forcing said shoes against said guiding projections.

19. A brake as claimed in claim 1, in which the two said shoes are symmetrical and interchangeable.

References Cited by the Examiner
FOREIGN PATENTS
229,101   7/60   Australia.

ARTHUR L. LA POINT, *Primary Examiner.*
R. DAVID BLAKESLEE, *Examiner.*